United States Patent [19]

Meyer et al.

[11] 3,743,976

[45] July 3, 1973

[54] CHANNEL SELECTING UNIT FOR HF TELECOMMUNICATION EQUIPMENT

[75] Inventors: Herbert Meyer, Rottweil-Buehlingen; Rudolf Mayer, Rottweil; Lothar Volkheimer, Trossingen, all of Germany

[73] Assignee: Messrs. R. & E. Hopt KG

[22] Filed: July 1, 1970

[21] Appl. No.: 51,556

[30] Foreign Application Priority Data

July 4, 1969 Germany .................. P 19 33 976.5

[52] U.S. Cl. ...................... 334/47, 334/54, 334/52, 338/179, 338/200, 334/15

[51] Int. Cl. ............................................ H03j 5/00

[58] Field of Search .................... 334/15, 47, 49–55, 334/46; 338/129, 200, 179

[56] References Cited

UNITED STATES PATENTS

| | | | |
|---|---|---|---|
| 2,464,045 | 3/1949 | Kuenstler | 334/54 X |
| 3,624,582 | 11/1971 | Iwasaki | 338/179 |
| 3,381,254 | 4/1968 | Campbell | 338/179 |
| 2,779,827 | 1/1957 | Brown et al. | 338/200 X |
| 2,774,063 | 12/1956 | Grinstead et al. | 338/129 X |
| 3,275,958 | 9/1966 | Rehm et al. | 334/54 X |
| 3,400,345 | 9/1968 | Oloff | 334/47 |
| 3,439,292 | 4/1969 | Henry | 334/15 X |
| 3,508,176 | 4/1970 | Labude et al. | 334/15 X |

*Primary Examiner*—Herman Karl Saalbach
*Assistant Examiner*—Saxfield Chatmon, Jr.
*Attorney*—Craig, Antonelli and Hill

[57] ABSTRACT

This is a channel selecting unit for radio and television receivers which comprises preset tuning units disposed in a row one behind the other, and a slide movable in a direction parallel to the row of tuning units. The tuning units and the slide are provided with contacts and contact bridges, respectively. By selectively positioning the slide adjacent to any of said tuning units the contacts of the selected tuning units are connected by means of the said contact bridges to bus bars extending parallel to the row of tuning units and are connected to associated circuits. Further, the slide may be provided with adjusting means which may be operatively connected to the adjacent tuning unit to adjust the setting of same.

15 Claims, 7 Drawing Figures

Figure 1:
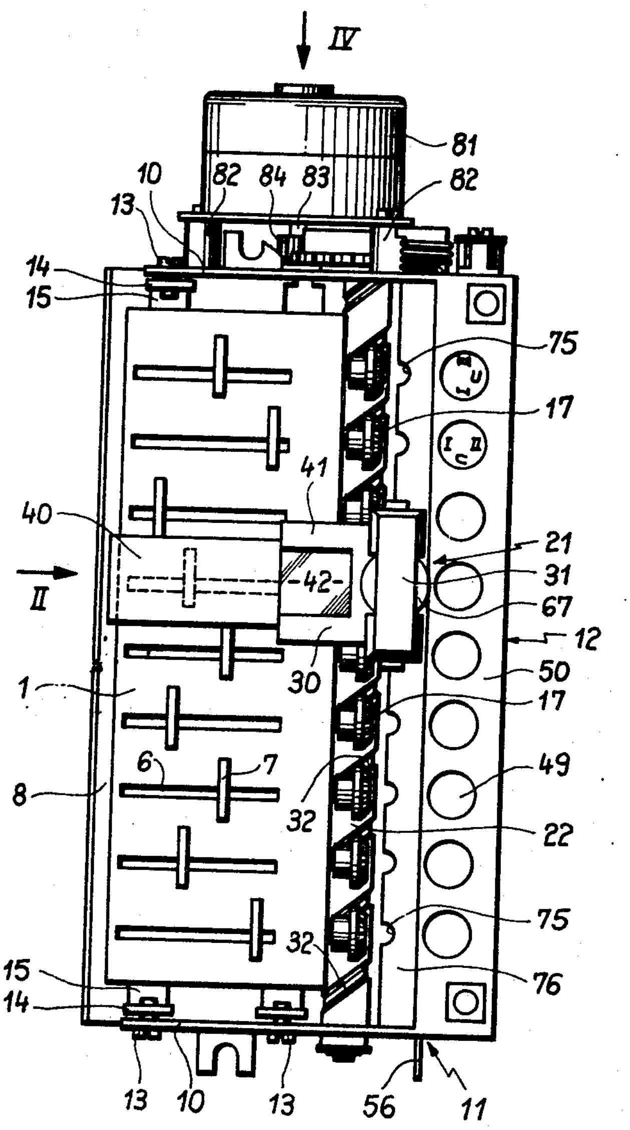

INVENTORS
HERBERT MEYER, RUDOLF MAYER
AND LOTHAR VOLKHEIMER

BY Craig, Antonelli, Stewart + Hill
ATTORNEYS

INVENTORS
HERBERT MEYER, RUDOLF MAYER
AND LOTHAR VOLKHEIMER

BY Craig, Antonelli, Stewart & Hill
ATTORNEYS

INVENTORS
HERBERT MEYER, RUDOLF MAYER
AND LOTHAR VOLKHEIMER

BY Craig, Antonelli, Stewart + Hill
ATTORNEYS

INVENTORS
HERBERT MEYER, RUDOLF MAYER
AND LOTHAR VOLKHEIMER

BY Craig, Antonelli, Stewart + Hill
ATTORNEYS

INVENTORS
HERBERT MEYER, RUDOLF MAYER
AND LOTHAR VOLKHEIMER
BY
Craig, Antonelli, Stewart & Hill
ATTORNEYS

CHANNEL SELECTING UNIT FOR HF TELECOMMUNICATION EQUIPMENT

The present invention relates to a channel selecting unit for HF telecommunication equipment and, more particularly, for radio and television receivers, comprising preset tuning units disposed in one plane in a row one behind another and service switches associated with each of said tuning units for selectively connecting any one of said tuning units.

In conventional channel selecting units of this kind, each tuning unit is associated with a switch having its own operating member, particularly a pushbutton, so that a row of operating members is located adjacent to the row of tuning units. It is a disadvantage of such a row of switches that it is too complex to permit the user to see at first glance which of the switches is on. Especially with low-stroke pushbuttons, it is very difficult to notice the difference in the position of a depressed button as compared with the other buttons. Another disadvantage consists in that all operating members of the switches must be mechanically interconnected so that a switch which is in the on-position is released when another switch is actuated. The measures required to accomplish this purpose are comparatively expensive so that the switches interconnected in this manner represent a substantial cost factor. Finally, it is also comparatively complicated to manipulate such a channel selecting units if the user of a radio or television receiver wishes to select a major member of preset stations in rapid succession to find out whether any of these stations offers a program which suits him. Especially with a television receiver, the user cannot concentrate his eyes on the screen, because after every glance at the screen he must redirect his attention to the switch panel in order to be able to operate one switch after the other in the desired sequence.

It is the object of the present invention to avoid these disadvantages of the known channel selecting units. According to the invention, this is accomplished by providing the channel selecting units with a slide which is movable in a direction parallel to the row of tuning units, actuating a service switch associated with the corresponding tuning unit whenever it is positioned adjacent to one of the tuning units, thus connecting the latter.

The manipulation of such channel selecting units is thus considerably simplified and improved by the invention. Connecting the individual tuning units and, thus, the preset stations is effected by simply displacing the slide so that the user may successively select a plurality of stations without having to pay any special attention to the operation. It is sufficient to move the slide along its track so that the user can concentrate his full attention on the various selected programs. The invention also eliminates the complex switch panels, leaving the set with a single control knob which is formed by a portion of the slide projecting from the set and the position of which can be ascertained at first glance, thus clearly indicating the tuning unit which is connected. Finally, the invention also considerably reduces the costs, because the switches associated with the various tuning units can be of an exceptionally simple design owing to the fact that the slide keeps them in their operative positions and because only one slide is needed instead of a plurality of pushbuttons or other operating elements. A special advantage of the invention consists in that it can be applied regardless of the number of tuning units envisaged and in that it results in a substantial simplification and cost reduction, especially with channel selecting units comprising a great number of such units, e.g., for 16 or 20 channels.

In the tuner according to the invention, the service switches can be simply formed by contacts provided on the tuning units, while the slide is provided with contact bridges to connect the contacts of the tuning unit positioned adjacent to the slide. An arrangement of this type combines minimum space requirement and very low manufacturing costs with maximum dependability.

According to a preferred embodiment of the invention, in which the tuning units are formed by potentiometers with parallel tuning spindles, the tuning spindles are electroconductively connected to the slider and the slide is provided with a contact bridge connecting the end of the tuning spindle with a bus bar running parallel to the row of tuning units.

The invention may also be applied to channel selecting units in which band switches are associated with the individual tuning units. In this case, a particularly advantageous embodiment of the invention is one in which a plurality of contact banks are disposed parallel to the path of the slide and displaceable elements, which selectively force the contacts of a contact bridge provided on the slide away from their associated contact banks or permit them to bear against said banks, are disposed in the region of each tuning unit. In this manner, the most varied circuit combinations required for selectively connecting any desired range may be provided by simple means in the region of each tuning unit. The elements may be formed by break-away stops or covers, for example, if it be desired to fix the relationship between the various bands and the individual tuning units once and for all at the time the set is put into operation. Alternatively, slidable strips may be provided which can be displaced individually and are also adjusted at the time of installing the set. In that case, the setting may be changed subsequently, although again this involves more than a simple adjustment from the outside.

In a preferred embodiment of the invention, a controller drum with cams is provided in the region of each tuning unit on the side of the contact banks facing away from the slide. The cams of this controller drum, which is disposed perpendicular to the longitudinal direction of the contact banks, project beyond the associated contact bank on at least one side of said banks in order to enable the contacts of the contact bridge to be lifted off. Such a controller drum permits the cam combinations corresponding to the contact-making positions for the various frequency ranges to be disposed in various angular positions along its circumference and enables the band setting to be changed by simply rotating the controller drum.

A particularly simple arrangement is one in which the contact banks are formed by wires. The controller drums may be provided with flanges enclosing the wires between them, said flanges featuring segmental cutouts to release the wires. The row of tuning units and the contact banks associated with the band switches are preferably disposed on opposite sides of the slide.

Generally, the slide may be guided in corresponding tracks of a housing in any desired manner. According to a particularly simple embodiment of the invention, the slide is guided on a rod provided with locking grooves and features a spring-loaded locking element engaged by said locking grooves. In a particularly preferred embodiment of the invention, the rod is supported in a manner permitting it to be rotated about its longitudinal center line and the locking grooves are formed by a screw thread whose pitch equals the spacing between the tuning units. In addition, the rod is connected to a motor and a control arrangement is provided for the motor which causes the motor to rotate the rod one full revolution in the desired direction in response to a signal. This arrangement enables the slide to be displaced along the rod by hand in a desired direction, the slide being secured on the rod in each operative position, in which it is opposite one of the tuning units, by the action of its locking element which is engaged by the screw thread of the rod. However, the same arrangement also enables the slide to be moved from one operative position to the next by rotating the rod with the aid of a motor imparting to the rod one full revolution at a time. This possibility of moving the slide either by hand or with the aid of a motor, as may be desired, so that the channel can be changed by remote control without any great elaborateness is a special advantage of the arrangement according to the present invention.

As a further development of the invention, the slide may be provided with elements which engage the positioning element and/or the band switch of the connected tuning unit with an actuating element. This may take the form of a central tuning device which, as is well known, features a tuning shaft extending along the tuning units and provided with coupling elements which may selectively be brought into engagement with a coupling element of the tuning units and/or the band switches. In such a case, the slide may be provided with control cams which move the coupling elements of the tuning units or band switches from their normal position of rest into an on-position so that the tuning unit connected at any moment and/or its band switch are engaged by the central tuning device.

However, according to a preferred embodiment of the invention, a tuning shaft which may be displaced along its longitudinal center line is movably supported in the slide in a position perpendicular to the direction of the slide movement, said tuning shaft carrying at least one gear which may be brought into mesh with a gear of each tuning unit and/or a gear of the band switch by displacing the shaft. In this case, only one tuning shaft disposed in the slide is needed so that such an embodiment of the invention again affords the special advantage of a particularly simple design. An advantageous arrangement is one in which one end of the tuning shaft is engaged by a recess in a stationary component in the position where the tuning shaft engages the gear of an element to be adjusted so that, when the tuning shaft is actuated, the slide is not only located in a detent but also safely locked in its position in manner preventing it from being shifted by the forces applied to effect the adjustment.

Although the slide itself provides a very good and readily noticeable indication of the connected channel, it may additionally be provided with a lighting arrangement for an indication window. Such a lighting arrangement may consist of a small lamp or a lighting plate, for example. However, such lamps require comparatively much space as well as a voltage supply, while lighting plates, although not requiring much space, must be connected to a very high voltage so that their application, too, involves certain difficulties. This the reason why in a preferred embodiment of the invention the slide is provided with a mirror disposed at an angle of 45° with respect to the front of the tuner and the longitudinal direction of the path along which the slide is displaced and a light source producing a beam which extends parallel to the direction of slide movement and hits the mirror is provided at one end of the tuner. In this manner, an indication window disposed opposite the mirror at the front of the tuner can be properly illuminated with the aid of a stationary light source. If the light emitted by this source is well focused there is no risk of the windows located between the illuminated window and the light source being noticeably illuminated by stray light.

According to another development of the invention, the tuning units may have pointer-carrying tuning spindles extending parallel to the front of the tuner and perpendicular to the direction of slide movement and the slide may be provided with a scale which in the operative positions of the slide coincides with the pointer on the associated tuning spindle. It is also possible to dispose the windows and/or pointers and scales in or under a hinged lid. Finally, it is an advantage if the tuner according to the invention is provided with a front plate featuring a slot through which a slide portion serving as a grip or connected with a grip may penetrate and if the slide is connected to an endless tape which is led around the tuner and covers said slot.

Figures 2, 3:
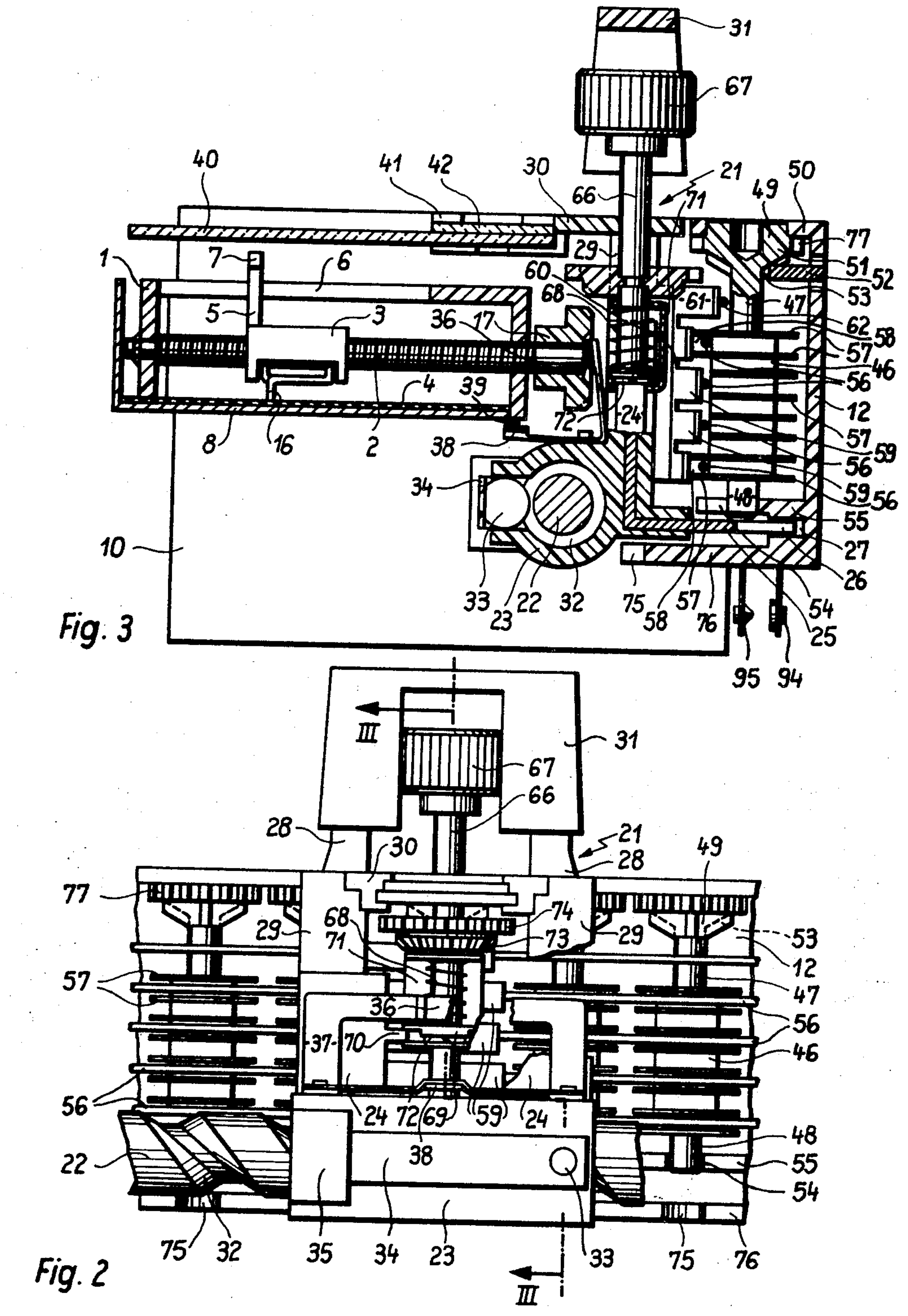
Figure 4:
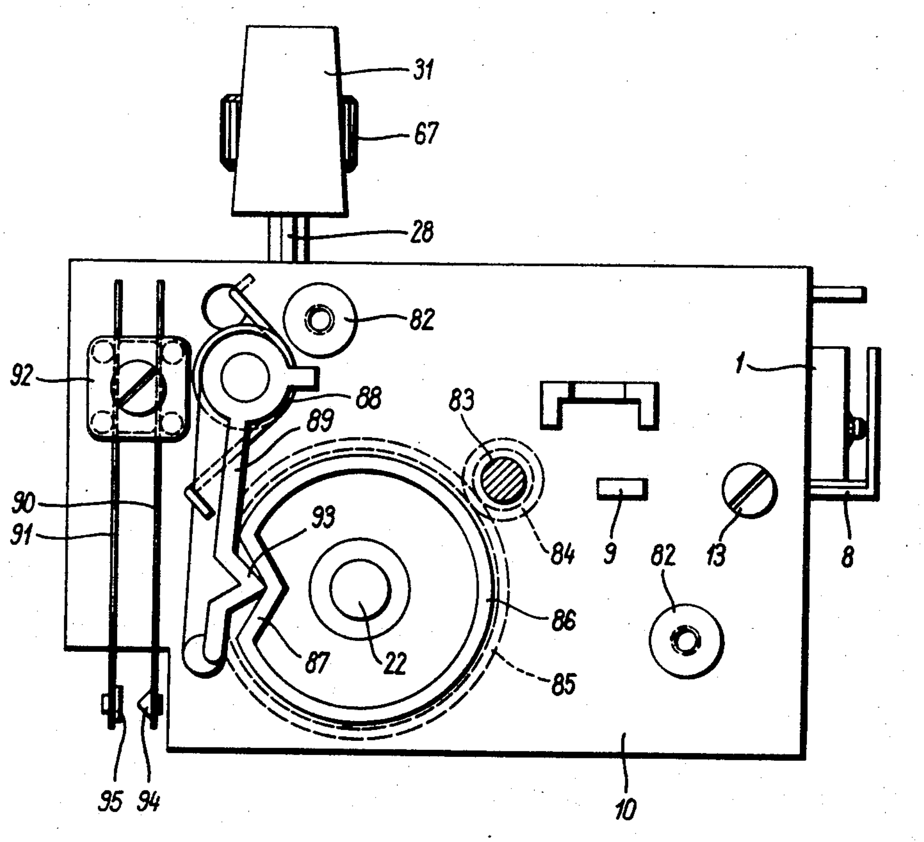
Figure 5:
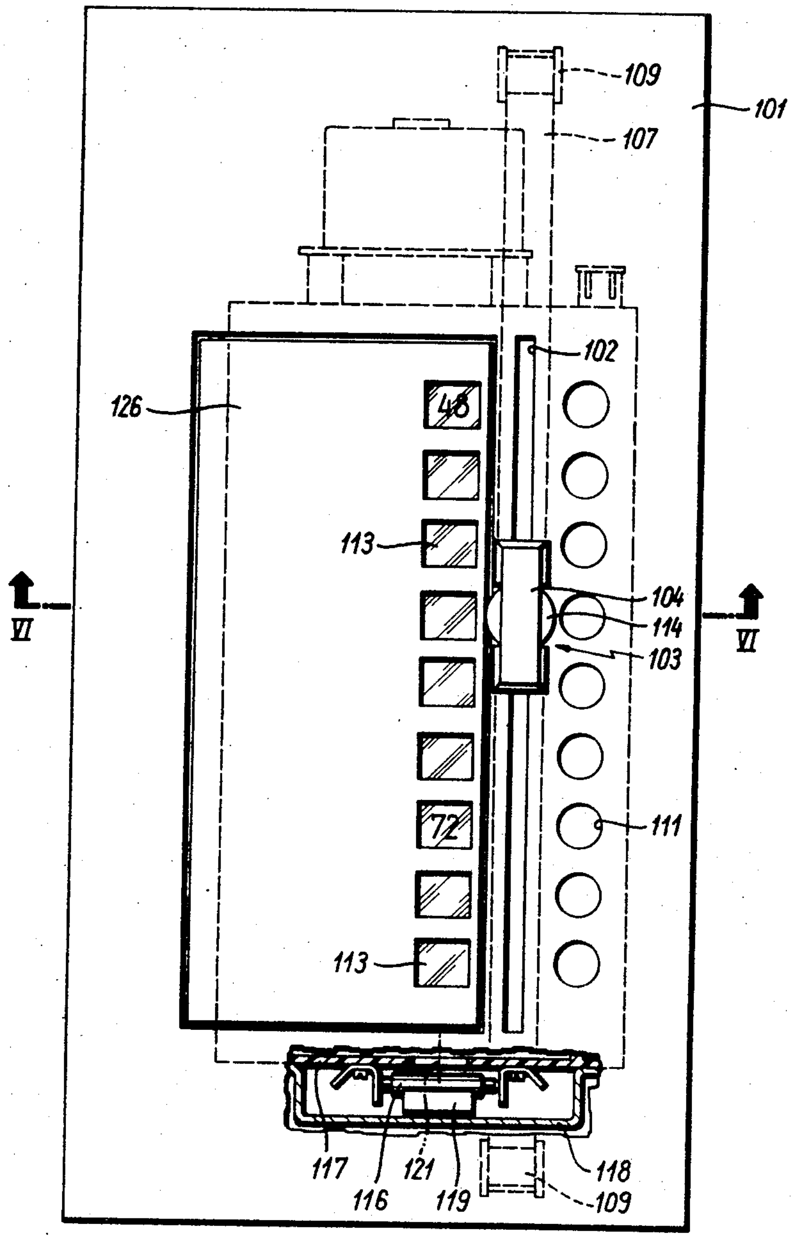
Figure 6:
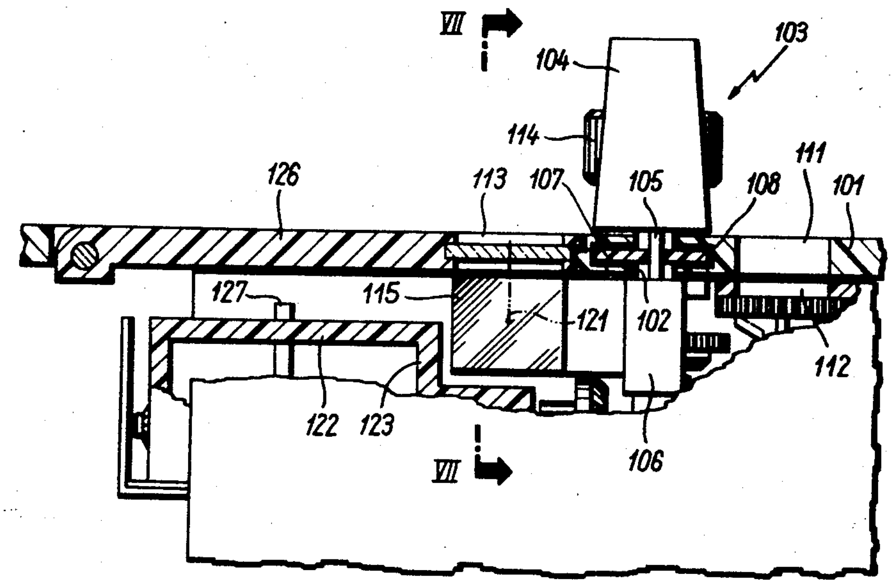
Figure 7:
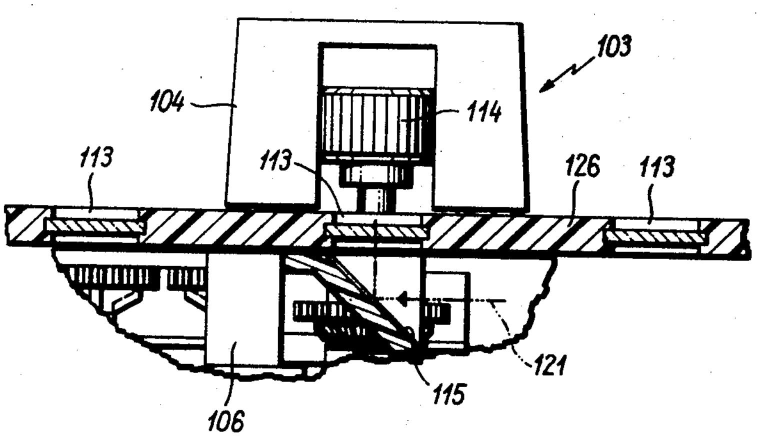

Further details and developments of the invention will become apparent from the following specification, in which the invention is described and explained in detail, reference being made to the embodiments shown by way of example in the accompanying drawing. In other embodiments of the invention, the features apparent from the specification and the drawing may be applied either individually or in any desired combination of a plurality of such features. In the accompanying drawing FIG. 1 is a top plan view of a channel selecting unit according to the invention, FIG. 3 is a section through the arrangement according to FIG. 1, taken along the line III—III of FIG. 2 and drawn on a larger scale, FIG. 2 is a view, drawn on a larger scale, of a portion of the channel selecting unit according to FIG. 1 seen in the direction of arrow II after removing the tuning units, FIG. 4 is a section through the arrangement according to FIG. 1, taken along the line IV—IV and drawn on a larger scale, FIG. 5 is a top plan view of a further embodiment of the invention similar to that shown in FIG. 1, FIG. 6 is a section through the arrangement according to FIG. 5, taken along the line VI—VI and drawn on a larger scale, and FIG. 7 is a partial section through the channel selecting unit according to FIG. 5, taken along the line VII—VII.

The channel selecting unit of the present invention as shown in FIGS. 1 through 4 features a total of 9 tuning units. As will be noted from FIG. 3, each of said tuning units comprises a tuning spindle 2 supported in a box-type housing 1 and mounting a potentiometer slider 3 cooperating with resistor means applied to a laminated-paper plate 4 covering the open side of the housing 1.

An arm 5 of the potentiometer slider 3 penetrates a slot 6 in the top of the housing 1. On the outside of the housing, the arm 5 is provided with a cross-member 7 serving as a pointer indicating the position of the potentiometer slider 3. The housing 1, together with the laminated-paper plate 4, is fastened on an angular sheet-metal carrier 8 whose lugs 9 (FIG. 4) are engaged by corresponding recesses in walls 10 of a supporting frame 11 which, together with its web-type portion 12 extending parallel to the housing 1, forms an open rectangle. The sheet-metal carrier 8 is secured to the walls 10 of the supporting frame 11 with the aid of screws 13 which are engaged by plate nuts 14 inserted in slots 15 of the sheet-metal carrier 8. The tuning spindles 2 are electroconductively connected to the contact 16 of the potentiometer slider 3 and provided with a bevel gear 17 made of some insulating material, such as plastic, at the end projecting from that side of the housing 1 which faces the web-type portion 12 of the supporting frame 11.

A slide 21 disposed in the region between the box-type housing 1 for the tuning units and the web-type portion 12 of the supporting frame 11 is provided for selectively connecting one of the tuning units comprising one tuning spindle 2 each. The slide 21 is slidably supported on a rod 22 secured in the walls 10 of the supporting frame 11 at a point below the box-type housing 1. The slide 21 includes a sleeve-type portion 23 which is slid onto the rod 22. This sleeve-type portion 23 is made of plastic and, at its two ends, provided with upwardly projecting arms 24 extending into the space between the housing 1 and the web-type portion 12 of the supporting frame 11 to approximately the level of the tuning spindles 2 (FIG. 3). The plastic component of the slide 21, comprising the sleeve-type portion 23 and the arms 24, incorporates an L-shaped reinforcing sheet 25 molded integral with said component and having a horizontal leg provided with a tongue 26 which projects from the plastic component and is engaged by a groove 27 of the web-type frame portion 12, thus locking the slide 21 to prevent inadvertent rotation. The L-shaped reinforcing sheet 25 is provided with two strap-type portions 28 projecting vertically upward through the arms 24 of the slide 21 and mounting further slipped-on parts of the slide. In this arrangement, the arms 24 of the lower slide portion are followed by arms 29 of a scale mount 30, while a bow 31 serving as a grip is slipped onto the outer ends of the strap-type portions 28.

The rod 22 is provided with locking grooves 32 with which cooperates a ball 33 disposed in the sleeve-type portion 23 of the slide 21 and loaded by a flat spring 34. The end of the flat spring 34 facing away from the ball 33 is inserted in a projection 35 on the sleeve-type portion 23. The arrangement of the locking grooves 32 is such as to provide the rod 22 with tuning locks for the slide 21, each of said tuning locks positioning the slide opposite one of the tuning spindles 2 of the tuning units disposed in the housing 1. In such a position, the projecting central portion 36 of a frame-type contact spring 37, bent to an angle at approximately the middle of two opposite legs and secured to the top of the sleeve-type portion 23 of the slide 21, bears against the end of the associated tuning spindle 2 projecting from the housing 1, while the central portion 38 of the second frame portion connecting the bent legs bears against a bus bar 39 formed by a wire extending along the lower edge of the housing 1 facing the slide 21. Thus, depending on the position of the slide 21, one of the tuning spindles 2 of the proposed tuning units is connected to the bus bar 39 so that the voltage tapped by the potentiometer slider 3 of the corresponding tuning unit is fed as control voltage to one or more tunable stages via the bus bar 39. If the potentiometer sliders 3 are adjusted to voltages by which specific receiving channels are tuned in, any of the existing tuning units and, consequently, any preset channel can be connected by displacing the slide 21. The specific channel tuned in at any moment may be read from the transparent scale 40 which is inserted in a lateral guide 41 on the scale mount and provided with scale divisions not shown in detail. Opposite these scale divisions and visible through the scale 40 is the cross-member 7, connected to the potentiometer slider 3, of that tuning unit to which the slide 21 has been adjusted and above the slot 6 of which the scale plate 40 is then located. In addition, the guide 41 of the scale mount 30 accommodates a lighting plate 42 covering that section of the scale 40 which is inserted in the guide 41. The lighting plate 42 is supplied with current in a manner not shown in detail, e.g., with the aid of trailing lines or contact bars, and provides a light source for illuminating a scale square not shown in detail which may be marked with a channel identification, for example. A scale square illuminated by the light source provides a particularly clear indication of the position of the slide 21 and the tuning unit thus connected.

In the embodiment of the invention shown in FIGS. 1 through 4, each tuning unit may be associated with any one of a plurality of frequency ranges, such as the medium wave range, short wave range, or ultra-short wave range of radio receivers and band I or band III of the VHF range or the UHF range of television sets. For this purpose, a band switch essentially consisting of a controller drum 46 rotatably disposed in the web-type portion 12 of the supporting frame 11 is provided for each tuning unit. Each controller drum 46 is provided with two journals 47 and 48 at its ends, the journal 47, which extends in the direction of the scale side of the channel selecting unit, having a head 49 which projects into a corresponding bore in the front 50 of the web-type portion 12. This head 49 is provided with a collar 51 bearing against the inner side of the front 50. The head 49 is kept engaged in the bore in the front 50 by a tongue-type spring 52 which bears against the underside of the head 49 and, simultaneously, is engaged by notches 53 on the underside of the head so that the controller drum 46 may assume a plurality of angular positions defined by the notches 53 engaging the tongue-type spring 52. The lower journal 48 projects into a slot 54 which is located in a web 55 at the inner side of the web-type portion 12 of the supporting frame 11 and opens towards the unattached edge of said web. The controller drums 46 are located on the side of the slide 21 facing away from the housing 1 with the tuning spindles 2 and extend in a direction perpendicular to both the motion of the slide and the disposition of the tuning spindles 2.

The controller drums 46 cooperate with contact banks formed by wires 56 which run tangential to the controller drums 46 and parallel to the direction in which the slide is displaced, i.e., parallel to the rod 22, on the side facing the slide 21 and are fastened to the web-type portion 12 of the supporting frame 11.

The contact banks formed by the wires 56 cooperate with flanges 57 located on the controller drum 46 and disposed in pairs on either side of each wire 56. These flanges 57 project beyond the associated wires 56, as is illustrated by the upper and lower pairs of flanges in FIG. 3, so that in the region of the controller drum 46 the wires are located in a kind of trough 58. However, the flanges 57 do not all extend over the full circumference of the controller drum, some of them being provided with segmental cut-outs whose secants extend in tangential relation to the controller drum 46 such that when these secants are adjacent and parallel to the wires 56, said wires are in an exposed position on the convex surface of the controller drum 46, as is illustrated by the two central wires 56 in FIG. 3. These central wires 56 are then accessible for the wiping spring contacts 59 of a spring-comb-type contact bridge 60, while the wiping spring contacts 59 opposite the outer two wires 56 are forced away from said wires by the flanges 57 of the controller drum 46. The contact bridge 60 features a further wiping spring 61 which is in permanent contact with a wire 62 disposed above the contact drum 46 and serving as a bus bar so that, depending on the angular position of the controller drum 46 one or more of the wires 56 are connected to the bus bar 62, with the result that signals are released by which a switch-over is effected from one frequency band to another. Consequently, each tuning unit can be associated with any one of a plurality of frequency ranges by simply rotating the corresponding controller drum 46 so that a displacement of the slide 21 will not only cut in a specific tuning unit but also establish the necessary connection for the desired frequency band between the wires 56 and the bus bar 62 on the controller drum 46 of the associated band switch.

An arrangement in which both the individual tuning units and the individual band switches are adjusted by means associated with each tuning unit and each band switch respectively would be practicable. For example, each tuning spindle might be provided with a tuning wheel for the desired band adjustment to which access might be gained by opening a lid or the like. Furthermore, in order to enable the controller drum to be rotated into the desired position, it would be sufficient to provide the head 49 of the journal 47 for the controller drum 46 with a screw slot. However, in the embodiment of the invention shown by way of example in FIGS. 1 through 4, the slide 21 includes a tuning shaft 66 which extends parallel to the controller drums 46 and, at its outer end, is provided with a tuning knob 67 located between the legs of the bow 31 serving as a grip for the slide 21. The tuning shaft 66 is supported in the plate connecting the arms 29 of the scale mount 30 and in the sleeve-type portion 23 of the slide in a manner permitting it to be rotated and simultaneously displaced in its longitudinal direction.

It is maintained in a central position by a helical compression spring 68 which concentrically surrounds the tuning shaft 66 and the lower end of which is seated on a plate 69 bearing against the top sides of projections 70 disposed on the inner sides of the arms 24 of the slide 21. The underside of these projections is contacted by the leg of a U-shaped bow 71 whose legs are both penetrated by the tuning shaft 66 and the other leg of which serves as an abutment for the upper end of the helical compression spring 68. Between the plate 69 and the leg of the bow 71 bearing against the projections 70 of the arms 24 there is a spring washer 72 fastened on the tuning shaft 66 so that when the tuning shaft 66 is raised the spring washer 72 will carry the plate 69 is raised the spring washer 72 will carry the plate 69 along with it against the force exerted by the helical compression spring 68, whereas when the tuning shaft is depressed the bow 71 will be carried along against the force of the helical compression spring 68.

In the region between the arms 29 of the scale mount 30 the tuning shaft 66 is provided with a bevel gear 73 which points downward and is followed by a spur gear 74 of a larger diameter, said spur gear being disposed above said bevel gear. When the tuning shaft is depressed against the force exerted by the helical compression spring 68, the bevel gear 73 engages the bevel gear 17 on the tuning spindle 2 of the tuning unit to which the slide 21 has been adjusted so that the tuning may be varied by rotating the tuning shaft with the aid of the tuning knob 67. In the embodiment of the invention shown by way of example, the helical compression spring 68 returns the tuning shaft 66 to the initial position when the tuning knob 67 is released. However, an alternative arrangement in which the bevel gears are kept in mesh by a lock for the tuning shaft would also be possible. When the tuning shaft 66 is depressed, the lower end of this shaft emerges from the underside of the sleeve-type portion 23 of the slide 21 and is engaged by one of the semi-circular recesses 75 provided at the edge of the lower wall 76 of the web-type portions 12 of the supporting frame 11. This ensures that the slide 21 cannot be displaced as long as the bevel gear 73 on the tuning shaft 66 is in mesh with the bevel gear 17 on one of the tuning spindles 2. Consequently, when the tuning is varied, the slide 21 can neither be shifted under the influence of the forces involved in the tuning operation nor can it be displaced if the tuning shaft 66 is lockable in the position in which its bevel gear 73 is in mesh with the bevel gear 17 of a tuning spindle.

The spur gear 74 disposed on the tuning shaft 66 is intended for band switching and cooperates with the collar 51 on the head 49 of the controller drum 46 which, for this purpose, is provided with a spur gear 77. By pulling up the tuning shaft 66, the spur gear 74 can be brought into mesh with the spur gear 77 on the collar 51 and the controller drum 46 can be rotated by turning the tuning knob in order to vary the frequency range setting. Again, when the tuning knob 67 is released, the helical compression spring 68 will return the tuning shaft 66 to a position of rest in which neither the bevel gear 73 is in mesh with a bevel gear 17 of the tuning units nor the spur gear 74 with the spur gear 77 of a controller drum 46.

To switch from one preset channel to another, the slide 21 can be readily moved by hand along the tuning means disposed in the housing 1. For that purpose, the slide 21 is guided on the rod 22 and provided with the bow 31, which serves as a grip, as mentioned previously. The locking action provided by the locking grooves 32 in the rod 22 and the sprung ball 33 disposed in the sleeve-type portion 23 of the slide is sufficient to hold the slide securely in selected positions opposite each tuning unit, but can also easily be overcome by hand so that no effort is required to move the slide 21. A special advantage of the embodiment of the intention shown by way of example in FIGS. 2 through 4 consists in that apart from being movable by hand the slide can also be displaced by means of a motor. To that end, the locking grooves 32, rather than consisting of individual rings, constitute a single groove surrounding the rod 22 in the form of a helix having a pitch which exactly corresponds to the spacing between the individual tuning units, i.e., the tuning spindles supported in the housing 1. As a result, the slide 21 is invariably moved along the rod 22 from one tuning unit to the other when the rod 22 completes one full revolution. This rotation may be imparted to the rod 22, which is rotatably supported in the supporting frame 11, by an electric motor 81 mounted on supports 82 on the outer side of one of the walls 10 of the supporting frame 11. That end of the motor shaft 83 which faces the wall 10 mounts a pinion 84 engaging a gear 85 fastened on that end of the rod 22 which projects from the wall 10. On the outer end face of the gear 85 there is a substantially ring-shaped web 86 which, at one point, is provided with an indentation 87. Bearing against said web is a follower lever 89 loaded by a legged spring 88 and pivoted on the outer side of the wall 10. Two contact springs 90 and 91, which form a switch, are disposed so as to run substantially parallel to said web. The contact springs 90 and 91 are restrained in a block 92 disposed on the outer side of the wall 10. As long as the projection 93 of the follower lever 89 lies in the indentation 87 of the web 86, the follower lever 89 is free of the adjacent contact spring 90 and the two contact springs 90 and 91 extend parallel to each other without touching. However, when the gear 85 on the rod 22 has been rotated to a point where the projection 93 of the follower lever 89 rides on the web 86 of the gear 85, the end of the follower lever 89 will push the contact spring 90 with its contact 94 against the cooperating contact 95 of the contact spring 91, thus closing the switch formed by the two contact springs.

If it be desired to effect the displacement of the slide 21 from one tuning unit to another by means of a motor, an electric voltage is supplied to the electric motor 81, in a manner not shown in detail, with the aid of a pulse generator triggered by a pushbutton or other switch until the running motor, via the pinion 84, has rotated the gear 85 to a point where the projection 93 of the follower lever 89 has left the indentation 87 in the web 86 of the gear 85 and the switch formed by the contact springs 90 and 91 has been closed. The sense of rotation of the motor can be altered by changing the polarity of the voltage supplied. The electric circuit required to keep the motor running is then kept closed by the switch consisting of the contact springs 90 and 91 until the projection 93 of the follower lever 89 falls back into the indentation 87 when the gear 85 with the rod 22 has completed substantially one full revolution. The switch formed by the contact springs 90 and 91 and, thus, the motor circuit are thereby reopened so that the motor is quickly stopped by the existing friction forces and the slide brought to a standstill opposite the next tuning unit. This procedure can be repeated in any direction unless the slide has reached the end of the row formed by the tuning units so that its direction must be reversed. To avoid errors, suitable devices such as limit switches, which are not shown in detail, may be provided at the ends of the row.

In the embodiment of the invention shown by way of example in FIGS. 5 through 7, a tuner whose design, apart from the details dealt with hereinafter, is identical with that of the tuner according to FIGS. 1 through 4, is disposed behind a front plate 101 provided with a longitudinal slot 102 for the slide 103 whose bow 104, serving as a grip, is located above said front plate 101 at a close distance from the latter, while the longitudinal slot 102 is penetrated by the bare strap-type portions of the reinforcing sheet incorporated in the slide, said strap-type portions being located between the bow 104 and the scale mount 106 disposed opposite the inner side of the front plate 101 at a close distance from the latter.

To prevent the ingress of dust or other foreign bodies into the interior of the set through the slot 102, this slot is covered by a tape 107, the edges of which are engaged by grooves 108 forming recesses in the front plate 101 parallel to the surface of the latter on either side of the slot 102, as will be noted from FIG. 6. The tape surrounds the portions 105 of the reinforcing sheet of the slide 103 and is led around the tuner over pulleys 109 in the form of an endless tape so that it can follow all movements of the slide 103 and the slot 102 is properly closed at any position of the slide.

Furthermore, the front plate 101 is provided with circular openings 111 disposed opposite the heads 112 on the upper journals of the controller drums such that the end faces of these heads and any band identification markings applied thereto are visible through the openings 111.

Opposite the openings 111, windows 113 provided with replaceable plates marked with channel identifications, for example, are disposed on the other side of the slot 102. Each of these windows 113 is associated with a tuning unit and the tuning unit connected at any moment is that adjacent to which the tuning knob 114 of the slide 103 is positioned. The connected tuning unit can be identified even more clearly by lighting the corresponding window 113. This may be accomplished by means of the lighting plate 42 envisaged for the embodiment of the invention according to FIGS. 1 through 4. Instead of such a lighting plate, a lamp may be used on the slide.

However, in the embodiment of the invention shown by way of example in FIGS. 5 through 7, the slide 103 is not provided with a self-lighting illuminator requiring a lead-in wire. Instead, a mirror 115 forming an angle of 45 degrees with both the front plate 101 and the direction of movement of the slide 103 is provided on the scale mount 106, as is clearly apparent from FIG. 7. In each locked position, this mirror 115 is opposite a window 113 and illuminated by a lamp 116 which, as shown in FIG. 5, is accommodated in a housing 118 on the outer side of the wall 117 of the supporting frame of the tuner and the light of which, focused by a parabolic reflector 119, is projected onto the mirror 115 through an opening 120 in the wall 117 as is illustrated by the beam path 121 indicated by the dot-dash line. As shown in FIG. 6, the box-type housing 122 accommodating the various tuning units is provided with a raised wall portion 123 adjacent to the path of the mirror 115 so that a kind of light tunnel is formed, the surface of which is preferably blackened in order to avoid interference by stray light. Without any complex circuitry and without the need for supplying electric voltages to the slide 103, the lighting arrangement shown enables any desired window 113 to be brightly illuminated by means of a single lamp 116, while all other windows remain dark.

As is also apparent from FIGS. 5 and 6, the front plate 101, above the housing 122 for the tuning units, has a flap 126 which, when raised, exposes the top of the housing 122 with the cross-members 127 which serve as pointers and are connected with the potentiometer sliders of the tuning units. In this case, there is no moving scale secured to the slide 103. Instead, scale divisions are provided on the top of the housing 122 in the region of each slot opposite the cross-members 127 so that the channel settings of the various tuning units can be ascertained by raising the flap 126, while in normal use of the tuner, when only preset channels are selected, the confusing array of scales remains hidden, the selected channel being indicated by the position of the slide 103 and the illumination of the window 113 only. The windows 113 are disposed at the edge of the flap 126 so that the replaceable plates provided for said windows may be readily inserted into corresponding guides from the edge of the flap.

It shall be understood that the present invention is not restricted to the embodiments shown by way of example and that deviations from these embodiments are possible without exceeding the scope of the invention. In particular, the tuning shaft in the slide may be omitted and other means provided for channel tuning or band selection in simple arrangements according to the invention. Channels selecting units according to the present invention are also feasible without a band switching facility. Furthermore, it is not necessary to provide a motor drive for the slide. Finally, such channel selecting units may be designed for any desired number of channels.

Having thus fully described our invention, what we claim as new and wish to secure by Letters Patent is:

1. A channel selecting unit for HF telecommunication equipment and, more particularly, for radio and television receivers, comprising:

a plurality of preset tuning units disposed in a row one behind the other, and a plurality of service switch means, coupled to each of said tuning units, for selectively providing a connection to any one of said tuning units, each of said service switch means being formed by contacts provided on said tuning units, characterized in that said channel selecting unit is provided with a slide which is movable in a direction parallel to the row of tuning units, said slide being provided with contact bridges for providing connections to the contacts of the tuning unit which is positioned adjacent to the slide, and for actuating the service switch means of a corresponding tuning unit, whenever, it is positioned adjacent to one of the tuning units, thus providing a connection thereto, and wherein band switches are associated with the individual tuning units, and being further characterized in that a plurality of contact banks are disposed parallel to the path of the slide and in that displaceable elements, which selectively force the contacts of a contact bridge away from their associated contact banks or permit them to bear against said banks, are disposed in the region of each tuning unit.

2. A channel selecting unit as claimed in claim 1, characterized in that a controller drum with cams is provided in the region of each tuning unit on the side of the contact banks facing away from the slide, the cams of said controller drum, which is disposed perpendicular to the longitudinal direction of said contact banks, projecting beyond the associated contact bank on at least one side of said contact banks in order to enable the contacts of the contact bridge to be lifted off.

3. A channel selecting unit as claimed in claim 2, characterized in that said contact banks are formed by wires and in that said controller drums are provided with flanges enclosing said wires between them, said flanges featuring segmental cut-outs to release the wires.

4. A channel selecting unit as claimed in claim 1, characterized in that the row of tuning units and the contact banks associated with the band switches are disposed on opposite sides of the slide.

5. A channel selecting unit as claimed in claim 1, characterized in that the slide is guided on a rod provided with locking grooves and in that said slide features a spring-loaded locking element engaged by said locking grooves.

6. A channel selecting unit as claimed in claim 1, characterized in that the slide is provided with a lighting arrangement for an indication window.

7. A channel selecting unit as claimed in claim 6, characterized in that said slide is provided with a mirror disposed at an angle of 45° with respect to the front of the unit and the longitudinal direction of the path along which said slide is displaced and in that a light source producing a beam which extends parallel to the direction of movement of said slide and hits said mirror is provided at one end of the unit.

8. A channel selecting unit as claimed in claim 1, characterized in that the tuning units have tuning spindles which carry pointers and extend parallel to the front of the unit and perpendicular to the direction of movement of the slide and in that said slide is provided with a scale which in the operative positions of said slide coincides with the pointer on the associated tuning spindle.

9. A channel selecting unit as claimed in claim 8, characterized in that windows and scales are disposed in or under a hinged lid.

10. A channel selecting unit for HF telecommunication equipment and, more particularly, for radio and television receivers, comprising:

a plurality of preset tuning units disposed in a row one behind the other, and a plurality of service switch means coupled to each of said tuning units, for selectively providing a connection to any one of said tuning units, characterized in that said channel selecting unit is provided with a slide which is movable in a direction parallel to the row of tuning units, and is guided on a rod provided with locking grooves with which a spring-loaded locking element is engaged, for actuating the service switch of the corresponding tuning unit whenever it is positioned adjacent to one of said tuning units, thus providing a connection thereto, and wherein said rod is supported in a manner permitting it to be rotated about its longitudinal center line and said locking grooves are formed by a screw thread whose pitch equals the spacing between the tuning units and, wherein said rod is connected to a motor and a control arrangement is provided for said motor which causes said motor to rotate said rod one full revolution in the desired direction in response to a signal.

11. A channel selecting unit for HF telecommunication equipment and, more particularly, for radio and television receivers, comprising:

a plurality of preset tuning units disposed in a row one behind the other, and a plurality of service switch means, coupled to each of said tuning units for selectively providing a connection to any one of said tuning units, characterized in that said channel selecting unit is provided with a slide which is movable in a direction parallel to the row of tuning units, for actuating the service switch of the corresponding tuning unit, whenever it is positioned adjacent one of the tuning units, thus providing a connection thereto, and wherein said slide is provided with elements which engage at least one of a positioning element and a band switch of the connected tuning unit with an actuating element.

12. A channel selecting unit as claimed in claim 11, wherein the tuning units are formed by potentiometers with parallel tuning spindles, characterized in that said tuning spindles are electroconductively connected to the slider and in that the slide is provided with a contact bridge connecting the end of the tuning spindle with a bus bar running parallel to the row of tuning units.

13. A channel selecting unit as claimed in claim 11, characterized in that a tuning shaft, which may be displaced along its longitudinal center line, is supported in the slide in perpendicular relation to the direction of movement of said slide, said tuning shaft carrying at least one gear which may be brought into mesh with a gear of each tuning unit and/or a gear of the band switch by displacing said shaft.

14. A channel selecting unit as claimed in claim 13, characterized in that one end of said tuning shaft is engaged by a recess in a stationary component in the position where said tuning shaft engages the gear of an element to be adjusted.

15. A channel selecting unit for HF telecommunication equipment and, more particularly, for radio and television receivers, comprising:

a plurality of preset tuning units disposed in a row one behind the other; and a plurality of service switch means, coupled to each of said tuning units, for selectively providing a connection to any one of said tuning units, characterized in that said channel selecting unit is provided with a slide which is movable in a direction parallel to the row of tuning units, for actuating the service switch of the corresponding tuning unit whenever it is positioned adjacent one of the tuning units, thus providing a connection thereto and, wherein said tuning unit is provided with a front plate featuring a slot through which a slide portion serving as a grip or connected to a grip may penetrate and in that the slide is connected to an endless tape which is lead around said tuning unit and covers said slot.

* * * * *